Patented Sept. 18, 1923.

1,468,390

UNITED STATES PATENT OFFICE.

HARRY W. MORSE, OF STANFORD UNIVERSITY, CALIFORNIA, ASSIGNOR TO WEST END CHEMICAL COMPANY, OF OAKLAND, CALIFORNIA, A CORPORATION OF CALIFORNIA.

METHOD OF CONCENTRATING BRINES.

No Drawing.   Application filed September 6, 1921.   Serial No. 498,869.

*To all whom it may concern:*

Be it known that I, HARRY W. MORSE, a citizen of the United States, residing at Stanford University, in the county of Santa Clara and State of California, have invented a new and useful Method of Concentrating Brines, of which the following is a specification.

This invention relates to the concentration of brines containing salts of potassium and sodium, and particularly to the concentration of Searles Lake brine, occurring at Searles Lake, California, the main object of the invention being to provide for a relatively high concentration of potassium salt by means of solar evaporation.

The brine of Searles Lake has the following approximate composition in grams of salt per liter:

| | |
|---|---|
| Potassium chloride | 63.0% |
| Sodium chloride | 210.0 |
| Sodium biborate | 20.5 |
| Sodium carbonate | 68.0 |
| Sodium sulfate | 84.0 | and this brine has a temperature of about 21° C. as it is pumped from the wells.

At the temperature at which it is pumped from the salt-body any concentration by solar evaporation results in the formation of a solid salt (Glaserite) containing potassium.

At higher temperatures, such as are found for a considerable part of the year at Searles Lake, concentration can be carried on to some extent without the formation of solid salts containing potassium, but only a comparatively slight concentration can be attained in this way.

I have found that it is possible to obtain concentration to a much higher point by control of the sulfate content of the brine, so as to decrease the concentration of the sodium sulfate. One way in which sodium sulfate can be removed from the brine is by heating the brine with solid sodium chloride. The raw brine to be treated is mixed, or placed in contact, with solid sodium chloride and heated to near the boiling point of water for from one-half hour to two hours.

Raw brine which has been heated to near the boiling point of water in the presence of solid sodium chloride has the following approximate composition in grams per liter:

| | |
|---|---|
| Potassium chloride | 65.0 |
| Sodium chloride | 270.0 |
| Sodium biborate | 21.0 |
| Sodium carbonate | 50.0 |
| Sodium sulfate | 35.0 |

After treatment in this way the brine can be concentrated at a minimum temperature of 21° C. to a potassium chloride content of over 100 grams per liter without the separation of any solid potassium salt.

When a solar pond has once been started with brine which has been treated for the removal of sulfates, as described, and after evaporation has proceeded sufficiently to raise the carbonate to a high concentration, say 100 grams per liter, raw brine, which has not been previously treated in any way, can be added to the brine already concentrated, without separation of any solid salt of potassium.

For example, after heat-treatment with sodium chloride and after exposure to solar evaporation, a concentrated brine may contain:

| | Grams per liter. |
|---|---|
| Potassium chloride | 105.0 |
| Sodium chloride | 200.0 |
| Sodium carbonate | 110.0 |
| Sodium sulfate | 58.0 |
| Sodium biborate | 35.0 |

Raw brine can now be added to this pond in volume sufficient to dilute to 90 grams of potassium chloride per liter. After a few days of evaporation the total volume will return to the original concentration of 105 grams of potassium chloride per liter. More raw brine can then be added and the process continued, the addition of raw brine and evaporation to the original potassium concentration being repeated until any desired amount of solution containing potassium chloride at the stated concentration is obtained.

Instead of raw brine, that is to say brine taken directly from Searles Lake, it is also possible under certain conditions to use brine which has been previously evaporated in preliminary ponds at sufficiently high temperature to prevent the loss of potassium by the formation of solid potassium salts, such partially concentrated brine being added to the prepared pond in the same manner as above described in the case of the addition of raw brine. In this connection it may be stated that the brine pumped from the body of liquid at Searles Lake at a considerable depth below the surface is at a temperature of about 21° C. and could not be concentrated without loss of potash at this temperature. In some cases, however, it is desirable to take the brine from shallow ponds after preliminary concentration. For the hotter portion of the year the minimum temperature in such ponds is well above 21° C. and it is possible to concentrate in them to about 80 grams of potassium chloride per liter, starting with about 65 grams per liter in the raw brine. This partially concentrated raw brine containing 80 grams of potassium chloride per liter is then removed to the prepared ponds for dilution, such prepared ponds having a low content of sodium sulfate and a high content of sodium carbonate by reason of the preparatory treatment above described.

A brine containing sodium and potassium salts in the proportions of Searles Lake brine can be concentrated to over 100 grams per liter of potassium chloride without loss of potassium by formation of solid potassium salts provided the sodium carbonate concentration is kept at a high figure and provided the minimum temperature of the pond does not fall below 21° C.

Where it is desired to produce a crude salt as high as possible in potassium by solar evaporation, it is evidently of advantage to be able to concentrate the brine in preliminary ponds up to 100 grams of potassium chloride per liter, then moving this concentrated brine to other ponds in which it is evaporated to approximate dryness.

When the original raw brine of Searles Lake is evaporated to dryness the dry salt will contain approximately:

| | |
|---|---|
| Potassium chloride | 14.0% |
| Sodium chloride | 47.0 |
| Sodium biborate | 4.5 |
| Sodium carbonate | 15.5 |
| Sodium sulfate | 19.0 |

A brine which has been concentrated with control of the sulfate content up to 100 grams of potassium chloride per liter will give a dry crude salt of the following approximate composition:

| | |
|---|---|
| Potassium chloride | 20.0% |
| Sodium chloride | 40.0 |
| Sodium biborate | 7.0 |
| Sodium carbonate | 22.0 |
| Sodium sulfate | 11.0 |

A brine containing sodium and potassium salts in the proportions of Searles Lake brine can be concentrated to over 100 grams per liter of potassium chloride without loss of potassium by formation of solid potassium salts provided the sodium carbonate concentration is kept at a high figure and provided the minimum temperature of the pond does not fall below 21° C.

Under the conditions of pond operation described above sodium sulfate is removed from the brine in the form of a double sulfate-carbonate of sodium. This substance is slightly soluble compared with either the sulfate or the carbonate, when the concentration of either sodium sulfate or sodium carbonate in the brine is high. If the sodium sulfate content of the brine is made high, the double sulfate-carbonate will crystallize out until the sodium carbonate content of the residual brine is low. If the sodium carbonate content is high, the double sulfate-carbonate will crystallize out until the sodium sulfate concentration of the residual brine is low.

For the purpose of concentrating such a brine in potassium, it is desirable that the sodium sulfate content of the brine be kept as low as possible. This can be attained by keeping the sodium carbonate high.

The purpose of the preliminary treatment of the brine is, therefore, to make a brine low enough in sulfate so that it can be carried to a high concentration of sodium carbonate by solar evaporation without separation of solid potassium salts.

Once the treated brine has been concentrated to a high carbonate content, raw brine can safely be added, as the high carbonate content causes the separation of the double sulfate-carbonate and the sulfate content of the brine is in this way kept low.

What I claim is:

1. The method of treating Searles Lake brine which consists in making a prepared brine by removing a portion of the sulfate content thereof by heating the brine in the presence of solid sodium chloride, then subjecting the brine to solar evaporation to produce a brine high in carbonate, and then adding brine containing substantially the full potassium salt content of the Searles Lake brine concentrated by preliminary evaporation at such a temperature as will prevent the separation of solid potassium salts, to the prepared brine, and again evaporating to restore the high carbonate content of the brine.

2. The process for the concentration of the potassium content of Searles Lake brine which consists in removal of sodium sulfate from the brine by heating the brine in the presence of solid sodium chloride, evaporating the treated brine to a high carbonate content and then adding, in successive stages, raw brine, partially concentrated by preliminary evaporation at such a temperature as will prevent the separation of solid potassium salts, to the brine high in carbonate in such amounts and in such manner that the high carbonate content of the brine is at each stage restored to its original value before further addition of raw brine.

3. The process for the concentration of potassium salts in a Searles Lake brine comprising a preliminary stage of removing sulfate from a portion of the total volume of brine to be evaporated, such removal being effected by heating the brine in the presence of solid sodium chloride, then evaporating the desulfated brine to a high carbonate content, and then adding to the brine so evaporated, a Searles Lake brine, then continuing the evaporation in a series of stages adding a Searles Lake brine after each stage as the sulfate is precipitated and as the carbonate content is restored by the evaporation.

4. The method of removing a part of the sodium sulfate from Searles Lake brine which consists in heating the brine in the presence of solid sodium chloride to a temperature approaching the boiling point of water, and maintaining this temperature for from one-half hour to two hours.

In testimony whereof I have hereunto subscribed my name this 8th day of August, 1921.

HARRY W. MORSE.